(12) United States Patent
Grace, VII

(10) Patent No.: US 9,580,097 B2
(45) Date of Patent: Feb. 28, 2017

(54) APPARATUS AND METHOD FOR EFFICIENTLY TRANSPORTING VARIOUS ARTICLES

(71) Applicant: RWGCO, LLC, Middleburg Heights, OH (US)

(72) Inventor: Robert W. Grace, VII, Columbus, OH (US)

(73) Assignee: RWGCO, LLC, Middleburg Heights, OH (US)

( * ) Notice: Subject to any disclaimer, the term of this patent is extended or adjusted under 35 U.S.C. 154(b) by 5 days.

(21) Appl. No.: 14/558,806

(22) Filed: Dec. 3, 2014

(65) Prior Publication Data

US 2015/0086323 A1    Mar. 26, 2015

Related U.S. Application Data

(63) Continuation of application No. 13/772,842, filed on Feb. 21, 2013.

(60) Provisional application No. 61/604,931, filed on Feb. 29, 2012.

(51) Int. Cl.
*B62B 5/00* (2006.01)
*B65D 25/00* (2006.01)
*B62B 1/14* (2006.01)
*B62B 1/26* (2006.01)

(52) U.S. Cl.
CPC ............... *B62B 5/00* (2013.01); *B62B 1/14* (2013.01); *B62B 1/26* (2013.01); *B65D 25/005* (2013.01); *B62B 2202/02* (2013.01); *B62B 2202/12* (2013.01); *B62B 2203/70* (2013.01); *Y02W 30/807* (2015.05)

(58) Field of Classification Search
CPC .. B62B 1/14; B62B 1/12; B62B 1/264; B62B 3/04; B62B 5/00; B65D 25/005
USPC ........ 414/444, 446, 490, 812; 220/481, 480, 220/476; 410/51, 80; 280/33.992, 280/33.996, 33.997, 47.26
See application file for complete search history.

(56) References Cited

U.S. PATENT DOCUMENTS

| | | | |
|---|---|---|---|
| 372,976 A | 11/1887 | Heilman | |
| 1,215,718 A | 2/1917 | Salisbury | |
| 1,803,058 A * | 4/1931 | Fontaine | B62B 1/14 414/446 |
| 2,182,005 A * | 12/1939 | Stetson | B65D 88/56 220/1.5 |
| 2,432,368 A | 12/1947 | Avril | |
| 2,812,190 A | 11/1957 | Clifton | |

(Continued)

FOREIGN PATENT DOCUMENTS

| | | |
|---|---|---|
| JP | 54124455 A | 9/1979 |
| JP | 05178590 A | 7/1993 |

*Primary Examiner* — Kaitlin Joerger
(74) *Attorney, Agent, or Firm* — Standley Law Group LLP

(57) ABSTRACT

A method for delivering articles using a container having a substantially vertical rear wall with a baseplate extending therefrom is disclosed herein. A plurality of articles may be loaded onto the baseplate. The rear wall, baseplate, and articles are preferably transported to the destination. Once at the final destination, the articles can be removed from the baseplate by sliding the baseplate and rear wall away from the articles. In some embodiments, the rear wall remains substantially vertical during transportation to the destination. In other embodiments, the rear wall can be removably connected to a wheeled apparatus for secure transport.

20 Claims, 8 Drawing Sheets

(56) References Cited

U.S. PATENT DOCUMENTS

| | | | |
|---|---|---|---|
| 3,436,093 A | | 4/1969 | Ruffley, Jr. |
| RE26,758 E | | 1/1970 | Kreeger |
| 3,870,177 A | | 3/1975 | Cobb |
| 3,874,689 A | | 4/1975 | Morgan |
| 3,983,799 A | * | 10/1976 | Paul ............... B65B 27/083 100/2 |
| 4,304,334 A | | 12/1981 | Hirota |
| 4,457,527 A | | 7/1984 | Lowery |
| 5,096,368 A | * | 3/1992 | Butterfield ............ B62B 1/14 206/449 |
| 5,465,987 A | * | 11/1995 | DellaVecchia ........ B62B 1/14 280/47.18 |
| 5,518,356 A | | 5/1996 | Krawczyk |
| 6,179,156 B1 | | 1/2001 | Aiken |
| 6,247,710 B1 | | 6/2001 | Luberda |
| 6,341,789 B1 | | 1/2002 | Checa et al. |
| 6,626,634 B2 | | 9/2003 | Hwang et al. |
| 6,655,892 B2 | | 12/2003 | Strohfus et al. |
| 6,874,981 B1 | | 4/2005 | Krawczyk et al. |
| 7,014,197 B2 | | 3/2006 | Baldwin et al. |
| 7,025,548 B2 | | 4/2006 | Krawczyk et al. |
| 7,392,992 B2 | | 7/2008 | Stone et al. |
| 7,500,681 B2 | | 3/2009 | Steadman |
| 8,292,117 B2 | | 10/2012 | Guibert et al. |
| 8,596,671 B2 | | 12/2013 | Myrant et al. |
| 8,840,121 B2 | | 9/2014 | Reeves |
| 2002/0187028 A1 | * | 12/2002 | Colini ................ B62B 1/264 414/444 |
| 2009/0014979 A1 | | 1/2009 | Snook et al. |
| 2012/0074664 A1 | | 3/2012 | Henny et al. |
| 2012/0181214 A1 | | 7/2012 | Kernen et al. |
| 2014/0125022 A1 | * | 5/2014 | Ambrefe, Jr. ............ B62B 1/26 280/79.3 |
| 2014/0246837 A1 | | 9/2014 | Delattre et al. |
| 2015/0028554 A1 | | 1/2015 | Schneider |

* cited by examiner

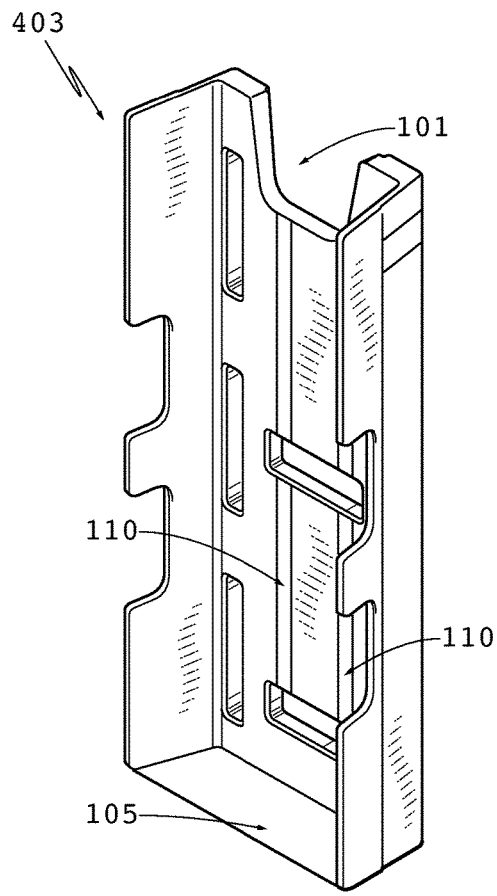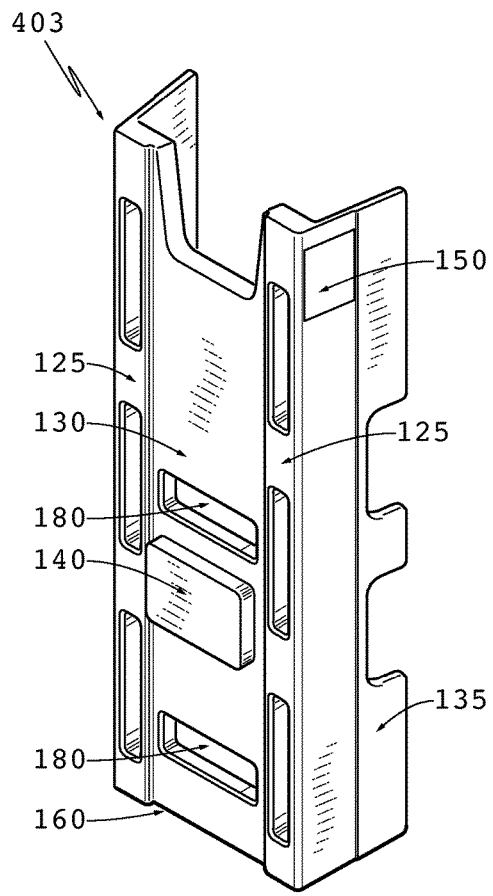
FIG. 6  FIG. 7
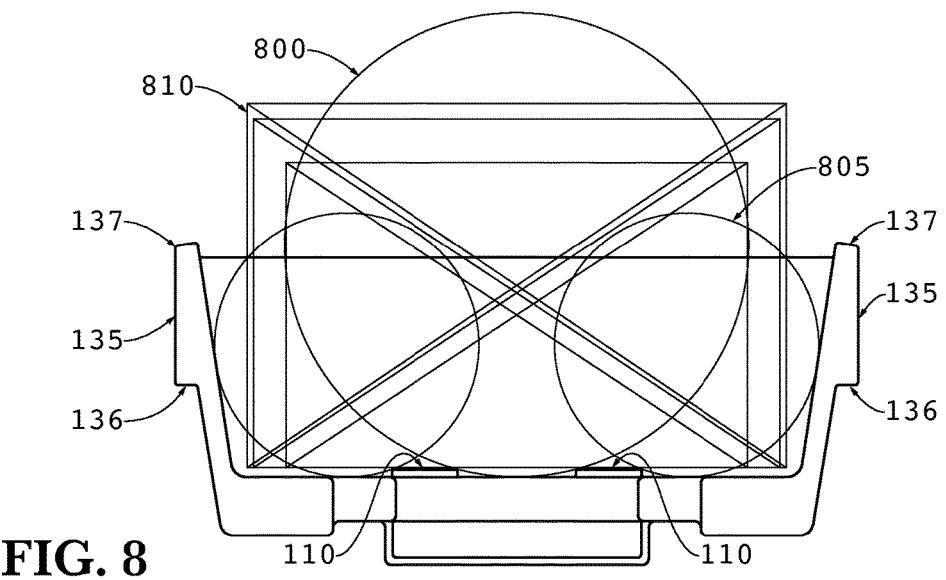
FIG. 8

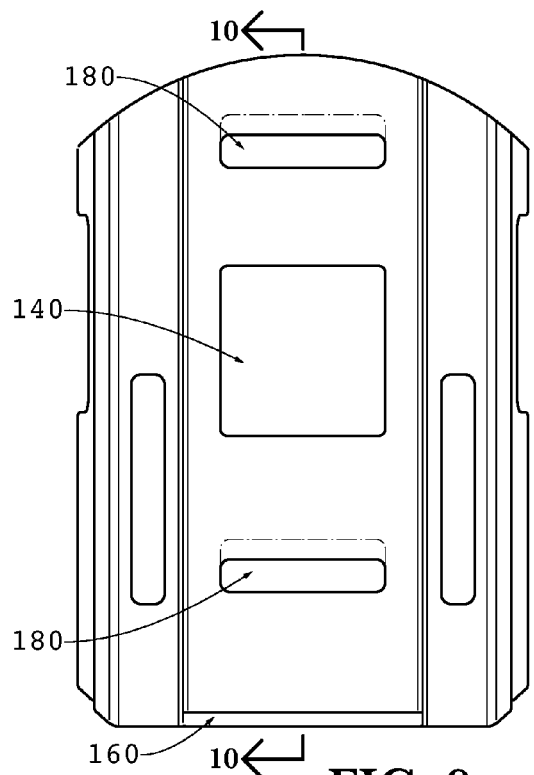
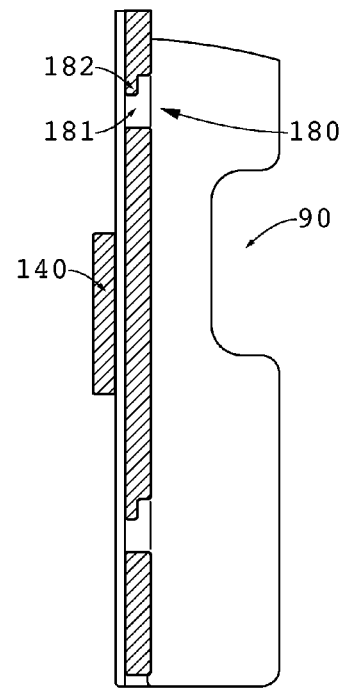
FIG. 9  FIG. 10
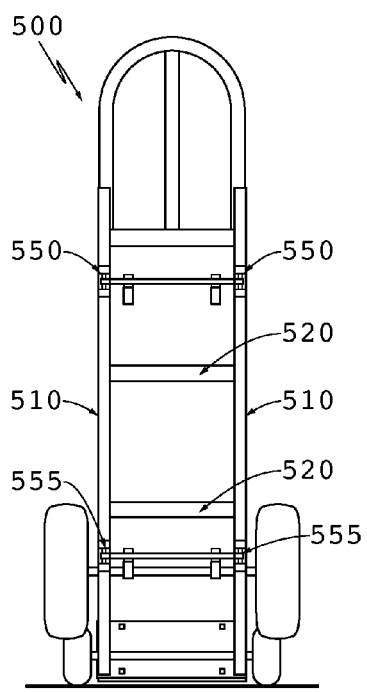
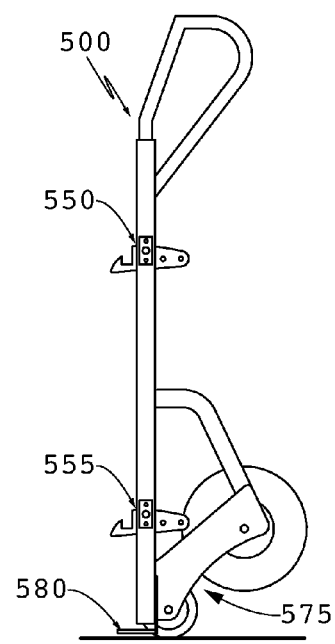
FIG. 11  FIG. 12

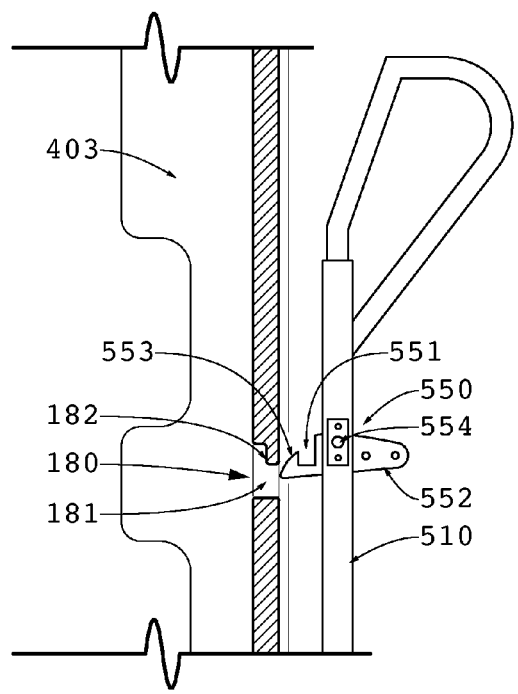 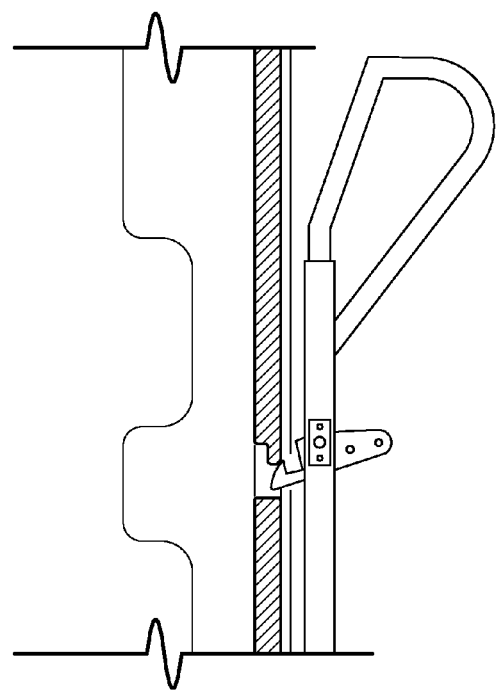
FIG. 13A   FIG. 13B
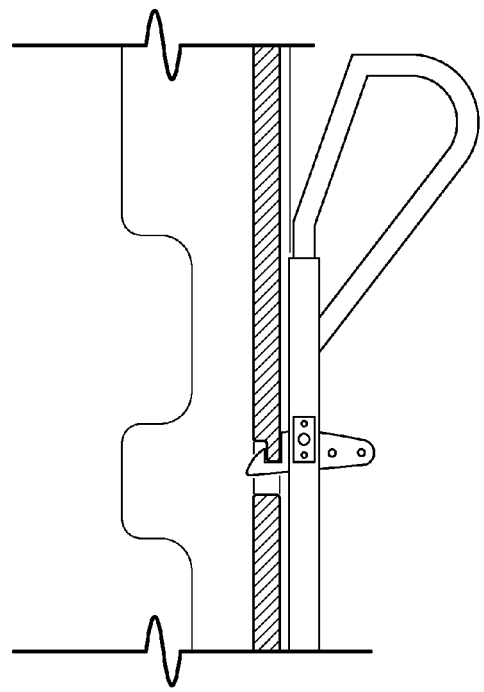
FIG. 13C

APPARATUS AND METHOD FOR EFFICIENTLY TRANSPORTING VARIOUS ARTICLES

CROSS-REFERENCE TO RELATED APPLICATIONS

This application is a continuation of co-pending U.S. application Ser. No. 13/772,842 filed on Feb. 21, 2013, which claims priority to Provisional Application No. 61/604,931 filed on Feb. 29, 2012, where both applications are herein incorporated by reference in their entirety.

TECHNICAL FIELD

Embodiments generally relate to an apparatus and method for efficiently transporting various articles, including but not limited to retail store articles such as beverages, food stuffs, and other consumer products for retail sale.

BACKGROUND OF THE ART

Consumer retail companies have been searching for more efficient ways of loading and delivering products to their customers. Currently, the major distributors of consumer retail products use Direct Store Delivery (DSD) as the method of delivering products from the distributor directly to the retail store, bypassing a retailer's warehouse. In this method, the vendor manages the product from order to shelf. While this method is preferable, there has been little innovation and advancement in the efficiency in the execution of product loading and delivery methods.

Using the beverage industry as an example, most beverage distributors divide their customer orders into two categories, bulk (box trailer) and route (sideload) truck deliveries. Bulk orders are typically for large retail customers who order quantities that would fill a pallet or multiple pallets of mixed SKU's. Bulk accounts typically are large grocery chains or general merchandise stores that have a truck dock area for receiving. Bulk orders are normally discrete picked to pallets, stretch wrapped and loaded in reverse route stop sequence for delivery. The pallets are typically moved into the customer's facility via pallet jack at the receiving docks.

Route orders are generally smaller customer orders like convenient stores, liquor stores or local bars and restaurants. Route orders are typically "batch" picked for a group of customers by package type to pallets and delivered via sideload delivery truck. Each pallet on the sideload truck is comprised of the aggregate quantity of each package and flavor for the "batch" of customer orders on the truck. This means that warehouse personnel "batch" pick the product once in the warehouse and the driver picks the discrete customer orders off of the truck into stacks of products which may fit on a two-wheel hand truck.

In studying sideload drivers in the soft drink industry, on a 16 bay truck, the driver typically handles each case on the truck four (4) times before delivering it. He also opens the overhead sliding bay doors 283 times per day to accomplish the day's deliveries. It has been found that this method causes a number of operation and ergonomic issues including inefficient handling practices and decreased productivity, product damage from handling and weather, inability to meet customer delivery windows, reduced customer service and merchandising time, and poor ergonomic conditions leading to OSHA and workers compensation issues.

These negative operational issues coupled with the effect of the SKU proliferation and the ever changing world of new packaging has had an immense impact on both the order picking and DSD process across many different industries. There is now a desire for a better means of truck loading and delivery to allow distribution facilities to increase productivity and provide an ergonomically friendly work environment for the delivery driver.

SUMMARY OF THE EXEMPLARY EMBODIMENTS

Exemplary embodiments provide an apparatus and method for transporting articles. A container is used which contains a rear wall and two side walls for containing the various articles. A base plate is preferably attached to the rear wall so that the container remains in an upright position when loaded with articles. A wheeled apparatus may engage with the container so that the container may be easily positioned within a transport vehicle, removed from the transport vehicle, and delivered to the customer. Once on site, the container can be removed from the articles without requiring the user to lift and remove each of the articles, saving the user time and ergonomic stress. The container can then be returned to the shipping hub for re-use.

The foregoing and other features and advantages of the exemplary embodiments of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIG. 6 is a front side perspective view of another exemplary embodiment of the container.

FIG. 7 is a rear side perspective view of another exemplary embodiment of the container.

FIG. 8 is a top view of the embodiment of the container shown in FIGS. 6 and 7, showing the positioning for differently sized packages and kegs.

FIG. 9 is a rear view of the container embodiment shown in FIGS. 6 and 7, indicating the section line A-A.

FIG. 10 is a sectional view along the section line A-A indicated in FIG. 9.

FIG. 11 is a front view of an exemplary embodiment of a wheeled apparatus for use with the container shown in FIGS. 6 and 7.

FIG. 12 is a side view of an exemplary embodiment of the wheeled apparatus shown in FIG. 11.

FIGS. 13A-13C are side views of the wheeled apparatus of FIG. 11 engaging with the container of FIGS. 6 and 7.

DETAILED DESCRIPTION

Figure 1:
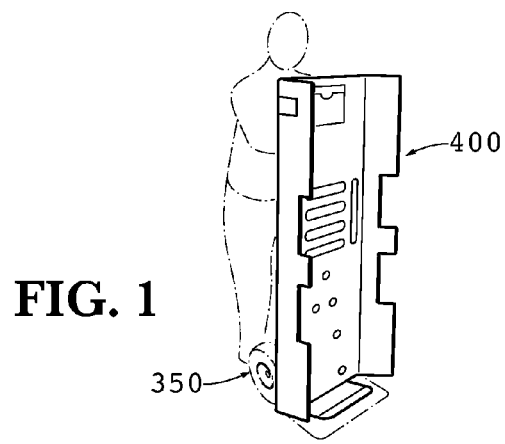
FIG. 1 is a perspective illustration of an exemplary embodiment of the apparatus for transporting articles while in use.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective illustration of an exemplary embodiment of the container 400 used with a wheeled apparatus 350. In some embodiments the wheeled apparatus 350 may be a hand truck or modified version of the same.

Figure 2:
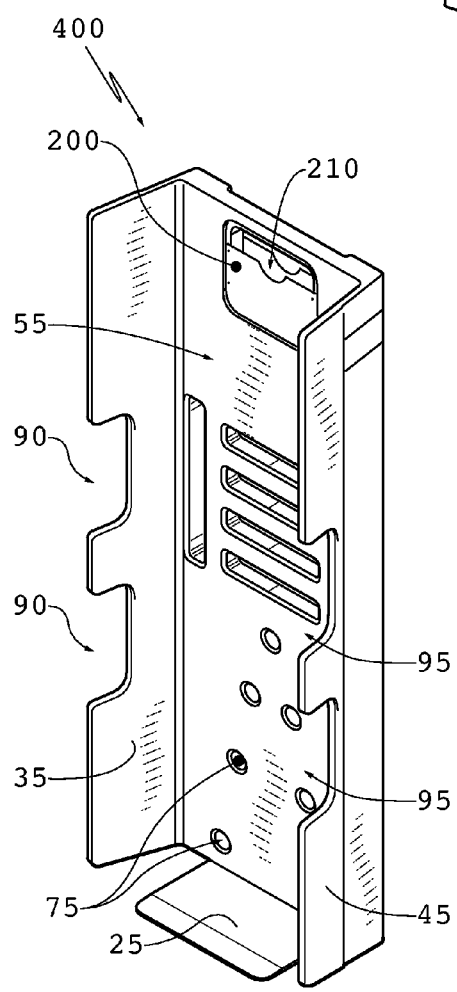
FIG. 2 is a front side perspective view of an exemplary embodiment of the container.

FIG. 2 is a front side perspective view of an exemplary embodiment of the container 400, which preferably contains a rear wall 55 and a pair of sidewalls 35 and 45 extending away from the rear wall 55. It is preferable for sidewall 35 to contain cutouts 90 and for sidewall 45 to contain cutouts 95. These cutouts 90 and 95 may provide the ability to transport a plurality of containers 400 with a skid steer, fork lift, pallet jack or any other device for transporting containers or pallets, the device having a pair of elongate members for inserting into the cutouts 90 and 95. This embodiment also contains a base plate portion 25 extending from the rear wall 55. In this particular embodiment, the base plate 25 is an extension of a rear plate 80 which may be fastened to the rear wall 55 using fasteners 75. This particular design is not required however, as the base plate 25 may simply be an extension of the rear wall 55 without the need to attach a separate component.

Figure 3:
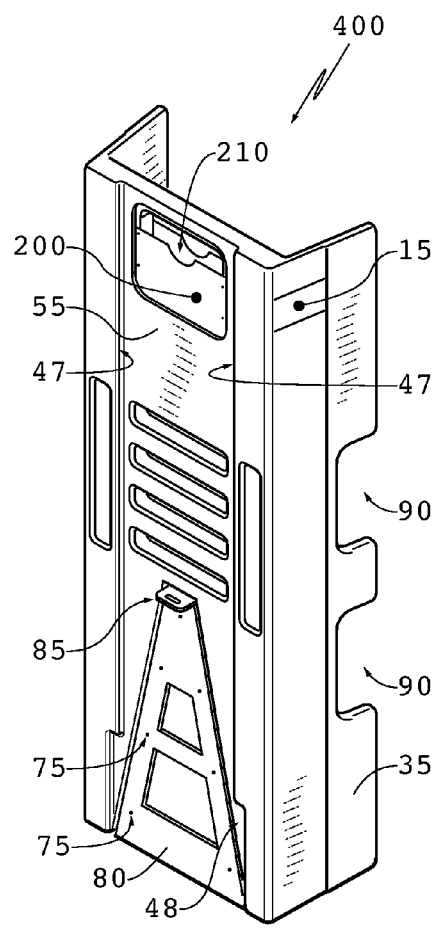
FIG. 3 is a rear side perspective view of an exemplary embodiment of the container.

FIG. 3 is a rear side perspective view of an exemplary embodiment of the container 400. A transparent window 200 is preferably positioned on the rear wall 55 and contains an opening 210 for accepting shipping documents, receipts, handling instructions, bar codes, or any other information pertinent to the contents within the container 400. In this embodiment, the rear plate 80 is fastened to the rear wall 55 with fasteners 75. The rear plate may also contain the aperture 85 for securing the container 400 to the wheeled apparatus 350. The aperture 85 can take on many forms, with the only requirement being that it accepts the corresponding securing feature in the wheeled apparatus 350. In this embodiment, the aperture 85 is simply an opening. In alternative embodiments, the aperture 85 may be a portion of the rear wall 400, rather than a separately attached component.

In the embodiment shown, it may be preferable to construct the rear plate 80 and base plate 25 as a singular component and preferably comprised of metal. This is not required however, as plastics and composites may also be used to create the rear plate 80 and base plate 25. Also in an exemplary embodiment, the rear wall 55 and side walls 35 and 45 may be comprised of plastic or a composite material. This is not required however, as these components could also be made of wood, metal, or a composite material as well.

In this embodiment, the rear wall 55 contains a recessed portion, defined between a pair of vertical edges 47 for accepting a portion of the wheeled apparatus 350. The vertical edges 47 may be sized and positioned to surround the wheeled apparatus 350 to further secure the container 400 to the wheeled apparatus 350 when desired. Also in this embodiment, the rear wall 55 contains a recessed portion 48 for accepting a base plate of the wheeled apparatus 350 (discussed further below). This embodiment also contains a badge portion 15 which may provide valuable information such as RFID, the owner of the container, barcodes, and any other pertinent information as to the contents of the container, destination for the contents, and final destination for the container.

Figures 4, 5:
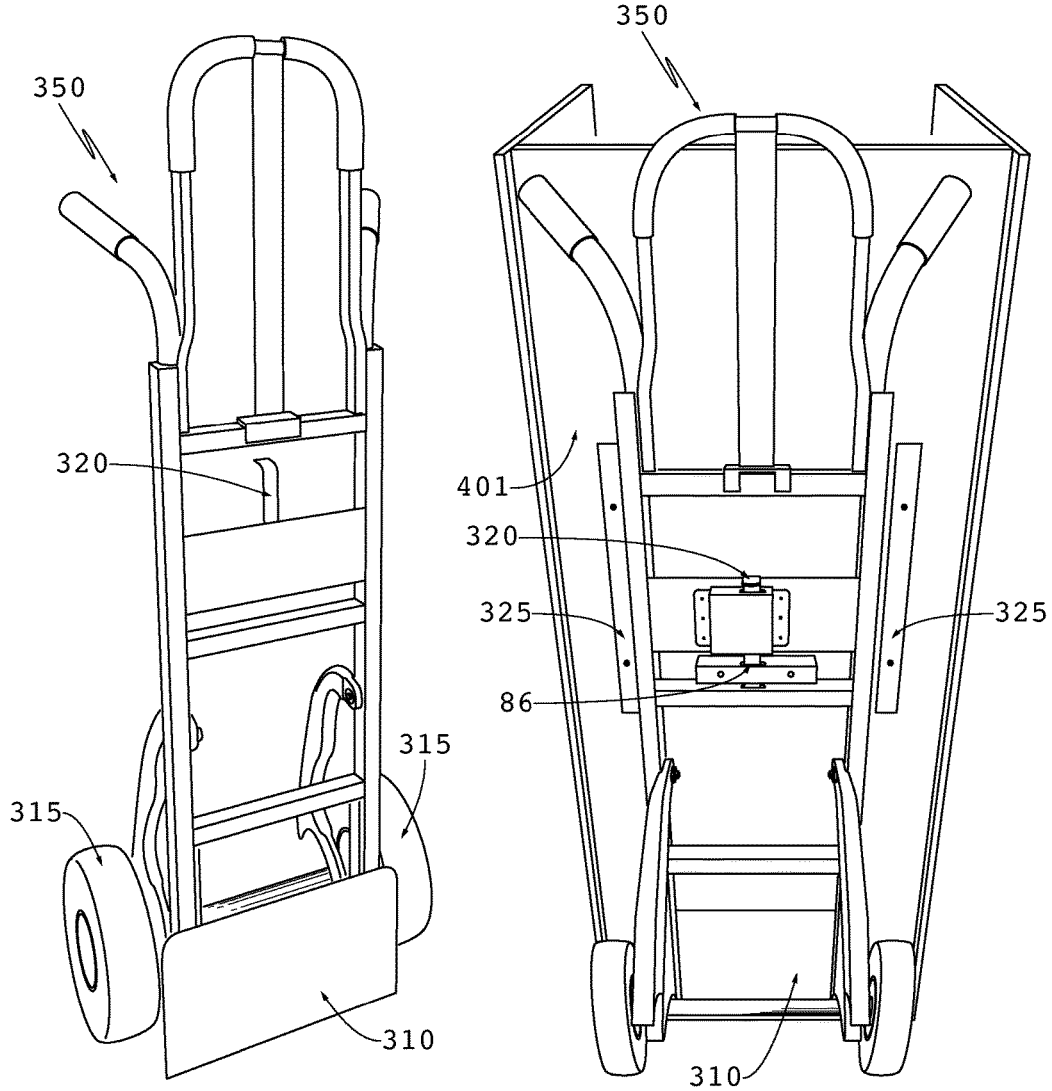
FIG. 4 is a front perspective view of an exemplary embodiment of a wheeled apparatus for use with the container.
FIG. 5 is a rear view of the wheeled apparatus of FIG. 4 when engaged with an embodiment of the container.

FIG. 4 is a front perspective view of an exemplary embodiment of a wheeled apparatus 350 for use with the container. FIG. 5 is a rear view of the wheeled apparatus 350 of FIG. 4 when engaged with another embodiment of the container 401. In this embodiment, the wheeled apparatus contains a frame which is supported by a means 315 for rolling the frame, typically a pair of wheels on an axle. This embodiment contains an optional base plate 310, which folds up (when engaging the wheeled apparatus 350 with the container) or down (when using the wheeled apparatus 350 as a traditional hand truck).

This embodiment of the wheeled apparatus 350 also contains an elongate member 320 for engaging with the aperture 86 on the rear wall of the container 401. In this particular embodiment, the elongate member 320 travels vertically to engage/disengage with the aperture 86. Here, the elongate member 320 is a flat bar while the aperture 86 is a slot. In this embodiment, the aperture 86 is fastened to the rear wall of the container 401. Of course, many other designs are possible for removably securing the wheeled apparatus 350 to the container 401, including but not limited to bolts or other fasteners or spring-loaded clips. This embodiment of the container 401 also contains a pair of vertical strips 325 which are positioned on the rear wall of the container 401 and sized to surround the frame of the wheeled apparatus 350 when engaged with the container 401.

FIG. 6 is a front side perspective view of another exemplary embodiment of the container 403. In this embodiment, the base plate 105 is simply a unitary piece with the entire container 403, possibly molded from the same material as the rest of the container 403. A pair of vertical locating ribs 110 travel up the front side of the rear wall of the container 403. A cutout 101 may be positioned at the top of the rear wall to improve the visibility of the user when moving the container 403.

FIG. 7 is a rear side perspective view of another exemplary embodiment of the container 403. A pair of vertical edges 125 extend vertically along the edges of the container 403 and also extend rearward away from the rear wall 130. The spacing between the edges 125 is preferably selected so that the edges 125 surround the vertical rails 510 of a wheeled apparatus 500 (discussed further below) when engaging with the container 403. A stabilizing rib 140 also preferably extends rearward away from the rear wall 130. The stabilizing rib 140 is also preferably sized so as to fit within the wheeled apparatus 500 to further secure the container 403 to the wheeled apparatus 500. One or more apertures 180 are preferably placed within the rear wall 130 so as to interact with the wheeled apparatus, further securing the two together. A notch 160 may be positioned at the bottom of the rear wall 130 and sized so as to accept a portion of the wheeled apparatus. Optionally, an identifying badge or window 150 may be positioned on the sidewall 135 of the container 403.

FIG. 8 is a top view of the embodiment of the container 403 shown in FIGS. 6 and 7, showing the positioning for differently sized packages 810 and kegs 800 and 805. For a traditional half-barrel keg 800, the vertical locating ribs 110 are preferably sized to allow the keg 800 to fit between the ribs 110 for stabilization when transporting the container 403. Alternatively, the space between the vertical locating ribs 110 and the sidewall 135 should preferably be sized to accept a traditional quarter-barrel pony keg 805.

Also shown in this figure is the nesting ledge 136, which travels along the sidewalls 135, parallel to the container 403. In this embodiment, each sidewall 135 extends away from the rear wall 130 until ceasing at an edge 137. Preferably, the sidewalls 135 extend outward and away from the rear wall 130 at an angle greater than 90 degrees, so that two containers 403 could be nested together for storage and/or transport. Preferably when nesting, the edges 137 of a first container 403 would rest against the nesting ledges 136 of a second container. This provides some stability to the nested containers for stacking and/or transportation.

FIG. 9 is a rear view of the container embodiment shown in FIGS. 6 and 7, indicating the section line A-A. FIG. 10 is a sectional view along the section line A-A indicated in FIG. 9. In this view, one specific embodiment for the aperture 180 can be observed. In this embodiment, the aperture 180 contains a pass-through portion 181 with an adjacent ledge 182.

FIG. 11 is a front view of an exemplary embodiment of a wheeled apparatus 500 for use with the container 403 shown in FIGS. 6 and 7. This embodiment of the wheeled apparatus 500 comprises a frame which has a pair of vertical rails 510 with adjoining horizontal rails. At least one pair of horizontal rails 520 may be sized to accept the stabilizing rib 140. In this particular embodiment, the horizontal rails 520 are positioned relative to the vertical rails 510 so as to define a shape which has substantially the same dimensions as the stabilizing rib 140. Specifically shown here, the stabilizing rib 140 is a rectangle which fits within another rectangle created by the horizontal rails 520 and vertical rails 510. Of course the stabilizing rib 140 could take on many shapes and sizes, while all that is necessary here would be to have features on the wheeled apparatus 500 which correspond with the stabilizing rib.

FIG. 12 is a side view of an exemplary embodiment of the wheeled apparatus 500 shown in FIG. 11. A plate 580 may extend from the bottom of the wheeled apparatus 500 and preferably sized to fit within the notch 160 at the bottom of the container 403. Of course, the wheeled apparatus 500 preferably contains some type of rolling means such as wheels 575. These are known in many shapes, sizes, and designs but will not be further described herein as any means for rolling the apparatus 500 would work with the exemplary embodiments herein.

FIGS. 13A-13C are side views of the wheeled apparatus 500 of FIG. 11 engaging with the container 403 of FIGS. 6 and 7. FIG. 13A shows the apparatus 550 just before starting to engage with the container 403. The latch 550 here is pivotally fastened to the vertical rail 510 at pivot point 554. This embodiment of the latch 550 contains a rear portion 552 (for disengaging the latch 550 with the aperture 180) and a front portion having a notch 551 and a slanted approach 553. Here, the latch 550 is preferably biased with a spring so that the notch 551 is vertically oriented.

FIG. 13B shows the latch 550 as it begins to engage with the aperture 180. As the latch 550 moves toward the aperture 180, the slanted approach 553 makes contact with and begins to slide along the ledge 182, which causes the latch 550 to rotate about the pivot point 554. As the latch 550 moves closer and closer to the container 403, eventually the notch 551 will be underneath the ledge 182 of the container 403. At this point, as shown in FIG. 13C, the biasing of the latch 550 will cause the latch 550 to rotate until the notch 551 has returned to a substantially vertical orientation and the ledge 182 is seated within the notch 551. The container 403 is now secured to the wheeled apparatus 500 for transport. To disengage the two, a user may apply an upward force on the rear portion 552 of the latch 550, causing it to rotate about pivot point 554 and disengage from the aperture 180. One or more additional latches 555 may also be used with an exemplary embodiment.

Figure 14:
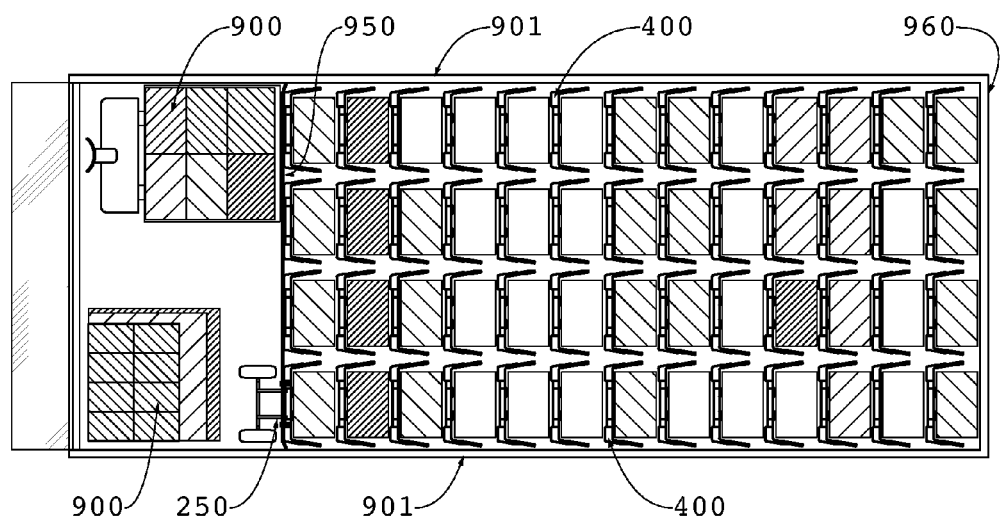
FIG. 14 is a top view of a truck loaded with a plurality of containers.

FIG. 14 is a top view of a truck loaded with a plurality of containers 400. As shown here, the rear walls of the containers 400 may face the rear of the truck such that a plurality of containers 400 can be loaded from the rear of the truck. The truck is preferably loaded by starting in the front of the truck 960. The width of the containers 400 may be selected such that a given number of containers 400 may substantially span the width between the sidewalls 901 of the truck, thus leaving only a relatively small amount of space for the containers to move (side to side) once positioned in the truck. To secure the containers front to back, they should preferably be positioned against a vertical support (such as the front wall of the truck) and either with another container directly behind them or with a strap or brace 950 running from sidewall 901 to sidewall 901. Thus, as containers 400 are removed from the back of the truck, to secure the remaining containers it is only necessary to replace the strap or brace 950. A wheeled apparatus 250 can be stored as shown and used to load/unload the containers 400.

Figure 15:
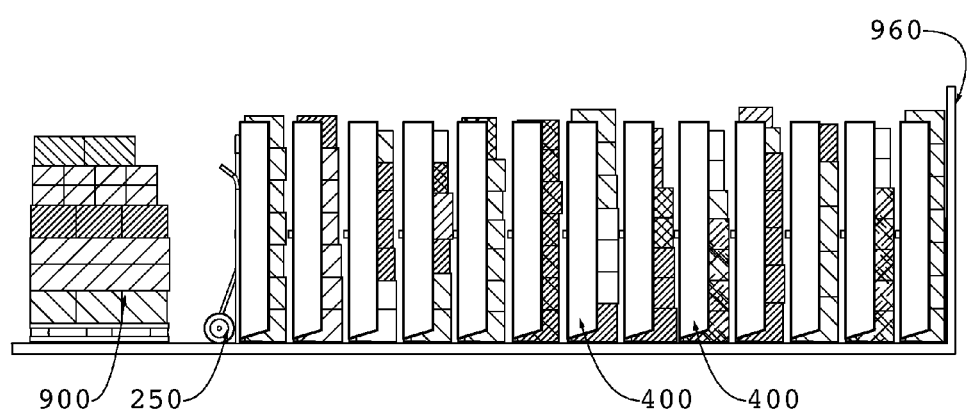
FIG. 15 is a side view of the loaded truck from FIG. 14.

FIG. 15 is a side view of the loaded truck from FIG. 6. As shown, traditional pallets 900 may be positioned along with the containers 400 so that both large clients and small clients may be serviced from the same truck. In this embodiment, the first stop in the delivery may be the traditional pallets 900. Afterwards, the driver removes containers, as they move towards the front 960 of the truck for stops 2 and onward. Of course, with the exemplary embodiments herein, the pallets 900 could easily be the $3^{rd}$ or $5^{th}$ stop on the driver's delivery schedule as the relatively small and mobile nature of the containers 400 allows them to slip past the pallet 900 so that the driver can deliver smaller clients first prior to delivering to the larger clients. These exemplary embodiments allow the driver's schedule to be determined purely by location of the clients and maximum efficiency and not by whether the clients are large or small.

Figure 16:
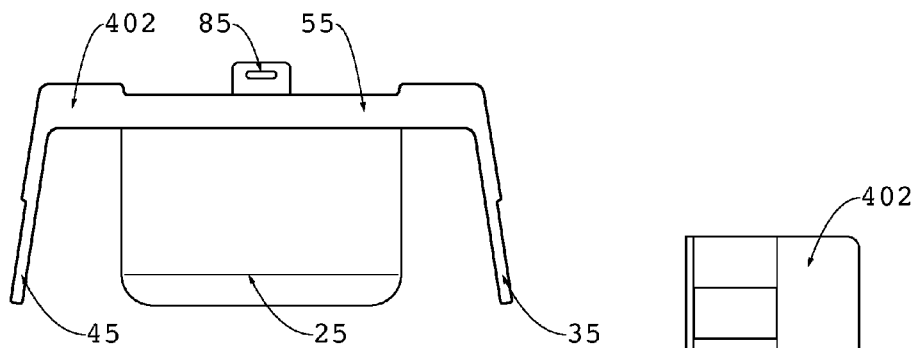
FIG. 16 is a top view of an exemplary embodiment of a container.
Figure 17:
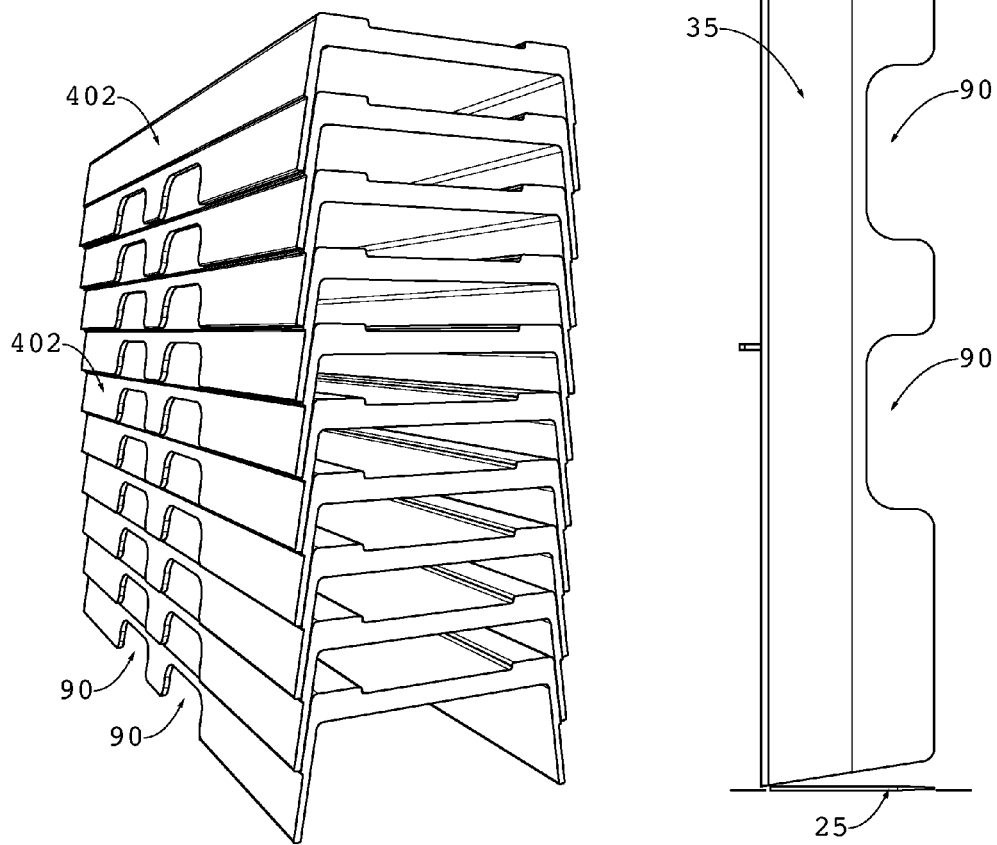
FIG. 17 is a perspective view of a plurality of containers nested together.

FIG. 16 is a top view of an exemplary embodiment of a container 402. In this preferred embodiment, the sidewalls 35 and 45 extend from the rear wall 55 at an angle greater than 90 degrees. FIG. 17 is a perspective view of a plurality of containers 402 nested together.

Figure 18:
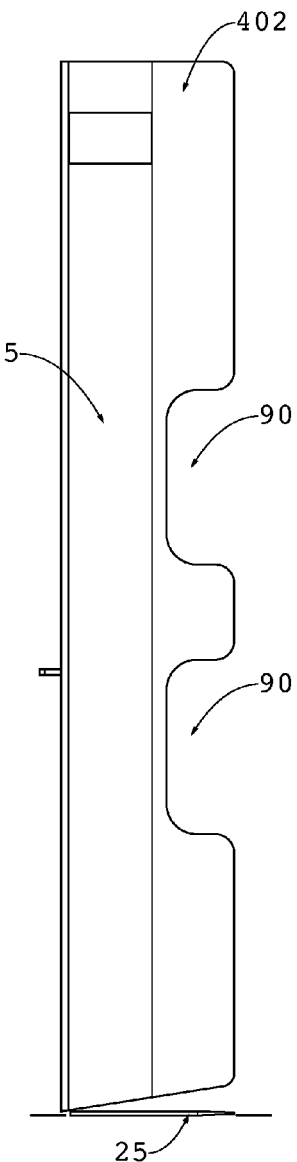
FIG. 18 is a side view of an exemplary embodiment of a container.

FIG. 18 is a side view of an exemplary embodiment of a container 402 having the cutouts 90 positioned near the center of the container 402. As shown in FIG. 9, this positioning of the cutouts 90 allows a plurality of nested containers 402 to be easily picked up and moved by a skid steer, fork lift, pallet jack or any other device for transporting containers or pallets, the device having a pair of elongate members for inserting into the cutouts 90.

Figure 19:
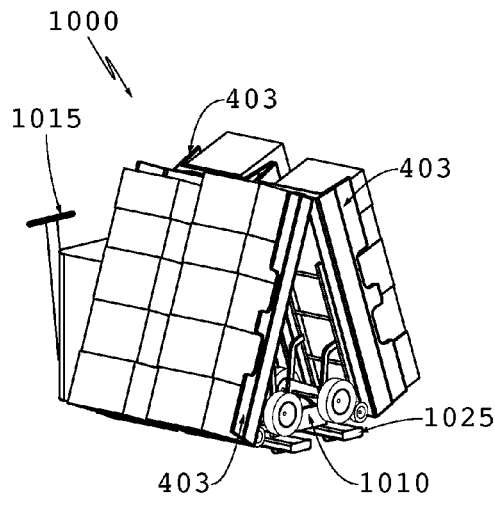
FIG. 19 is a perspective view of one embodiment for an apparatus for moving a plurality of containers.

FIG. 19 is a perspective view of one embodiment for an apparatus 1000 for moving a plurality of containers 403. The apparatus 1000 preferably contains a frame 1010 which accepts a plurality of containers 403, preferably such that the containers 403 are slightly angled backwards toward the rear wall so that they can be loaded with products during the picking phase of the distribution process. Wheels or casters 1025 are preferably attached to the frame 1010 along with a handle 1015 for moving the apparatus 1000 around.

Figure 20:
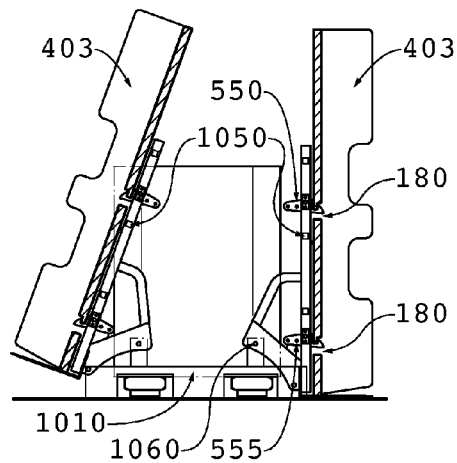
FIG. 20 is a front view of an apparatus for moving a plurality of containers and having a rotating latching assembly, where a container is being loaded onto the apparatus.

FIG. 20 is a front view of an apparatus 1000 for moving a plurality of containers 403 and having an optional rotating frame 1050 and latching assembly, where a container 403 is being loaded onto the apparatus 1000. Here, a rotating frame 1050 is pivotally fastened to the frame 1010 at pivot point 1060. The rotating frame 1050 preferably contains at least one latch 550, similar to those described above in FIGS. 11-13C. Alternatively, many other types of securing means may be used to secure each container 403 to the rotating frame 1050, including but not limited to the elongate member 320 and aperture 86 described above, as well as straps, pins, etc.

Figure 21:
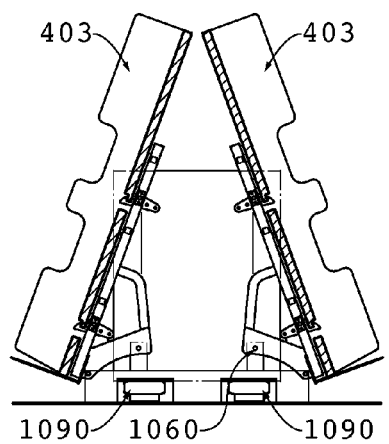
FIG. 21 is a front view of the apparatus shown in FIG. 20, where a container has been loaded onto the apparatus.

As shown in FIG. 20, rotating frame 1050 may be rotated outward so that it is near vertical and the latches 550 can engage with the apertures 180 in the container 403. FIG. 21 is a front view of the apparatus 1000 shown in FIG. 20, where the latches 550 have engaged with the apertures 180 and the rotating frame 1050 has been rotated inward, leaning the container 403 towards its rear wall. At this point, the container 403 has been securely loaded onto the apparatus 1000 and is ready for transport. Of course, although shown with space for two pairs of back-to-back containers 403, the apparatus 1000 could be designed to hold any number of containers 403 as the particular number of four is not required for the invention. Preferably, the frame 1010 of the apparatus 1000 contains a pair of access slots 1090 which allow the apparatus 1000 to be used with any type of skid steer, fork lift, pallet jack or any other device for transporting containers or pallets, the device having a pair of elongate members for inserting into the access slots 1090.

Figure 22:
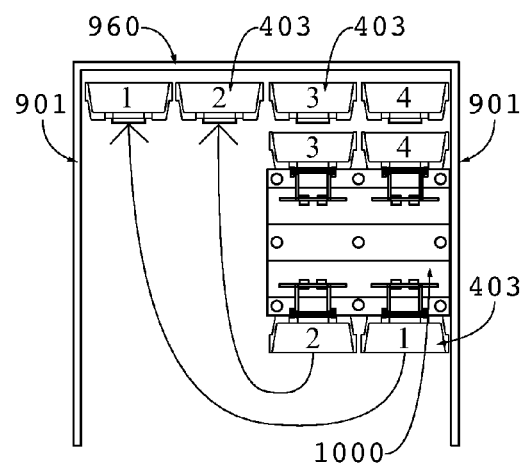
FIG. 22 is a top view of a truck being loaded with containers by the apparatus shown in FIG. 20.

FIG. 22 is a top view of a truck being loaded with containers 403 by the apparatus 1000 shown in FIG. 20. Here, one or more containers 403 can be positioned between the sidewalls 901 of the truck and against the front of the truck 960 and unloaded. The apparatus 1000 can then rotate approximately 180 degrees to now position the opposing container(s) 403 against the front of the truck 960 for unloading.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

I claim:

1. A method for delivering articles using a container having a substantially vertical rear wall with a baseplate extending therefrom, the method comprising the steps of:
   loading a plurality of articles onto the baseplate of the container so that a top surface of the baseplate is contacting an article and supporting the entire weight of said article while an opposing bottom surface of the baseplate is contacting the ground;
   transporting the rear wall, baseplate, and the plurality of articles to a destination; and
   sliding the rear wall and baseplate away from the articles so as to leave the articles at the destination.

2. The method of claim 1 wherein:
   the step of loading a plurality of articles onto the baseplate is performed by stacking the articles vertically.

3. The method of claim 1 wherein:
   the step of loading a plurality of articles onto the baseplate comprises placing the articles so that they contact the rear wall.

4. The method of claim 1 further comprising the step of: removing the rear wall and baseplate from the destination.

5. The method of claim 4 further comprising the step of: nesting the rear wall and baseplate with an additional rear wall and baseplate.

6. The method of claim 1 wherein:
   the step of transporting the rear wall, baseplate, and articles is performed while holding the rear wall substantially vertical.

7. A method for delivering articles using a container having a substantially vertical rear wall with a baseplate extending therefrom, the method comprising the steps of:
   loading a plurality of articles onto the baseplate of the container so that an article extends past a front edge of the baseplate to contact the ground and only contacts the ground and the baseplate of the container;
   loading the rear wall, baseplate, and the plurality of articles into a truck enclosure defined by a front vertical surface, where the rear wall is substantially parallel to the front vertical surface; and transporting the truck to a destination.

8. The method of claim 7 wherein:

the rear wall remains substantially parallel to the front vertical surface during the transporting step.

9. The method of claim 7 further comprising the step of:

loading a plurality of articles onto a second baseplate which extends from a second rear wall; and loading the second baseplate, second rear wall, and articles into the truck enclosure such that the rear wall is substantially co-planar with the second rear wall.

10. The method of claim 9 wherein:

the step of transporting the truck is performed while holding the rear wall and the second rear wall substantially co-planar.

11. The method of claim 7 further comprising the steps of:

connecting the rear wall to a wheeled apparatus;

removing the rear wall, baseplate, and articles from the truck; and removing the articles from the baseplate by sliding the rear wall, baseplate, and wheeled apparatus away from the articles.

12. The method of claim 11 further comprising the step of:

disconnecting the rear wall from the wheeled apparatus.

13. The method of claim 12 further comprising the step of:

nesting the rear wall and baseplate with an additional rear wall and baseplate.

14. A method for delivering articles using a container having a substantially vertical rear wall with a baseplate extending therefrom, the method comprising the steps of:

loading a plurality of articles onto the baseplate of the container so that the baseplate is sandwiched between the ground and an article;

connecting the rear wall to a wheeled apparatus without sliding anything between the articles and the ground;

transporting the rear wall, baseplate, and articles to a truck;

disconnecting the rear wall from the wheeled apparatus;

transporting the rear wall, baseplate, and the plurality of articles to a destination while holding the rear wall in a substantially vertical position;

connecting the rear wall to a wheeled apparatus;

removing the rear wall, baseplate, and articles from the truck;

removing the articles from the baseplate; and disconnecting the rear wall from the wheeled apparatus.

15. The method of claim 14 wherein:

the step of removing the articles from the baseplate is performed without lifting the articles.

16. The method of claim 14 wherein:

the step of connecting the rear wall to a wheeled apparatus comprises the insertion of an elongate member into an aperture on the rear wall.

17. The method of claim 16 wherein:

the elongate member is a flat bar and the aperture is a slot.

18. The method of claim 14 wherein:

the step of connecting the rear wall to a wheeled apparatus comprises engaging a latch attached to the wheeled apparatus with an aperture placed on the rear wall.

19. The method of claim 18 wherein:

the latch contains a notch which is sized to accept a ledge which extends from the aperture of the rear wall.

20. The method of claim 19 wherein:

the ledge and the notch are oriented substantially vertically.

* * * * *